United States Patent
Lee et al.

(10) Patent No.: US 9,623,822 B2
(45) Date of Patent: Apr. 18, 2017

(54) CRASH BOX FOR VEHICLE

(71) Applicants: Hyundai Motor Company, Seoul (KR); Kia Motors Corp., Seoul (KR)

(72) Inventors: Jeong Ho Lee, Whasung-Si (KR); Seung Mok Lee, Whasung-Si (KR); Hyun Gyung Kim, Whasung-Si (KR); Nam Cheol Kim, Whasung-Si (KR); Dong Eun Cha, Whasung-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 15/040,287

(22) Filed: Feb. 10, 2016

(65) Prior Publication Data

US 2016/0159303 A1 Jun. 9, 2016

Related U.S. Application Data

(62) Division of application No. 14/526,022, filed on Oct. 28, 2014, now Pat. No. 9,290,139.

(30) Foreign Application Priority Data

Jun. 3, 2014 (KR) ........................ 10-2014-0067946

(51) Int. Cl.
*B60R 19/34* (2006.01)
*B60R 19/30* (2006.01)
*B60R 19/02* (2006.01)

(52) U.S. Cl.
CPC ............ *B60R 19/34* (2013.01); *B60R 19/023* (2013.01); *B60R 19/30* (2013.01)

(58) Field of Classification Search
CPC ........ B60R 21/0132; B60R 2021/0006; B60R 21/20; B60R 21/013; E01F 15/146; B01D 35/027; B29C 45/1704; H01L 21/67326; H01L 21/67383; H01L 2924/0002
USPC ........................... 293/133; 180/274; 188/377
See application file for complete search history.

(56) References Cited

U.S. PATENT DOCUMENTS

| | | | |
|---|---|---|---|
| 4,413,856 A * | 11/1983 | McMahan | B60R 19/26 293/110 |
| 6,227,582 B1 * | 5/2001 | Ichien | B60R 19/18 293/132 |
| 6,705,653 B2 | 3/2004 | Gotanda et al. | |

(Continued)

FOREIGN PATENT DOCUMENTS

| | | |
|---|---|---|
| JP | 2005-162061 A | 6/2005 |
| JP | 2006-347262 A | 12/2006 |

(Continued)

*Primary Examiner* — Kiran B Patel
(74) *Attorney, Agent, or Firm* — Morgan, Lewis & Bockius LLP (57) ABSTRACT

A crash box for a vehicle may include a front connection portion that is connected to both ends of a back beam of the vehicle, a rear connection portion that is connected to a side member of the vehicle, an intermediate connection portion for connecting the front connection portion and the rear connection portion, which is formed as a hollow box shape and through which a cut cross-section of a heptangular shape is formed in a vehicle width direction, and a plurality of reinforcement ribs formed at an inner space of the intermediate connection portion.

9 Claims, 7 Drawing Sheets

(56) References Cited

U.S. PATENT DOCUMENTS

| | | | | |
|---|---|---|---|---|
| 6,808,215 B2* | 10/2004 | Sakuma | ............... | B60R 19/34 293/102 |
| 7,017,960 B2* | 3/2006 | Reierson | ............... | B60R 19/18 293/102 |
| 7,252,314 B2* | 8/2007 | Tamura | ............... | F16F 7/123 293/133 |
| 7,389,860 B2* | 6/2008 | Abu-Odeh | ............ | B62D 21/15 188/376 |
| 7,533,913 B2* | 5/2009 | Bae | ............... | B60R 19/34 293/132 |
| 7,871,122 B2* | 1/2011 | Salomonsson | ......... | B60R 19/34 296/187.03 |
| 7,926,868 B2* | 4/2011 | Braunbeck | ............ | F16F 7/123 293/132 |
| 8,210,601 B2* | 7/2012 | Terada | ............... | B62D 21/152 293/133 |
| 8,919,834 B2* | 12/2014 | Freundl | ............... | B60R 19/18 293/133 |
| 2002/0063433 A1* | 5/2002 | Gotanda | ............... | B60R 19/34 293/132 |
| 2005/0062300 A1* | 3/2005 | Toneatti | ............... | B60R 19/34 293/133 |
| 2008/0106107 A1* | 5/2008 | Tan | ............... | B60R 19/34 293/133 |
| 2009/0085362 A1* | 4/2009 | Terada | ............... | B60R 19/34 293/132 |
| 2010/0164238 A1* | 7/2010 | Nakanishi | ............... | F16F 7/12 293/132 |
| 2011/0291431 A1* | 12/2011 | Buschsieweke | ......... | B60R 19/34 293/133 |
| 2013/0048455 A1* | 2/2013 | Friedrich | ............... | B60R 19/34 188/377 |
| 2014/0292007 A1* | 10/2014 | Kawamata | ............ | B60R 19/34 293/133 |
| 2015/0115572 A1* | 4/2015 | Kim | ............... | B21D 53/88 280/500 |
| 2015/0217709 A1* | 8/2015 | Kim | ............... | B60R 19/34 293/133 |
| 2015/0232050 A1* | 8/2015 | Yamada | ............... | B60R 19/34 296/187.1 |

FOREIGN PATENT DOCUMENTS

| | | |
|---|---|---|
| JP | 2009-202630 A | 9/2009 |
| JP | 2009-280145 A | 12/2009 |
| KR | 10-2011-0072901 A | 6/2011 |
| KR | 10-2012-0010382 A | 2/2012 |
| KR | 10-1154262 B1 | 6/2012 |

\* cited by examiner

CRASH BOX FOR VEHICLE

CROSS-REFERENCE TO RELATED APPLICATION

The present application is a Divisional of U.S. patent application Ser. No. 14/526,022, filed Oct. 28, 2014, which claims priority to Korean Patent Application Number 10-2014-0067946 filed Jun. 3, 2014, the entire contents of which are incorporated herein for all purposes by these references.

BACKGROUND OF THE INVENTION

Field of the Invention

The present invention relates to a crash box for a vehicle, and more particularly, to a crash box for a vehicle which is installed between a side member and a back beam of a bumper which is positioned on a vehicle body to absorb impact energy when a collision occurs.

Description of Related Art

Generally, a bumper of a vehicle is installed at a front side and a rear side of the vehicle to protect a vehicle body and a passenger when a front or rear collision occurs and further protects a hood, and an engine and various devices installed in an engine room and the like.

The bumper is provided with a bumper cover that forms an outer shape of the bumper, an energy absorber that dampens impact when a collision occurs and has a shape recovery function after the collision, and a back beam (referred to as "bumper beam") that supports the energy absorber and is installed on the side member wherein a crash box 3 for absorbing impact energy when a collision occurs is installed between the back beam 1 and the side member 2.

The crash box 3 is configured to absorb impact energy by being compress-deformed in an axial direction (front/rearward) in a case where the impact energy is applied to the bumper and the crash box may be configured to minimize the deformation of the side member so as to minimize a repair cost.

Further, the crash box needs to be configured to satisfy the regulation of the Research Council for Automobile Repairs (RCAR), which is referred to as a representative regulation of the automobile industrial field.

Figure 1:
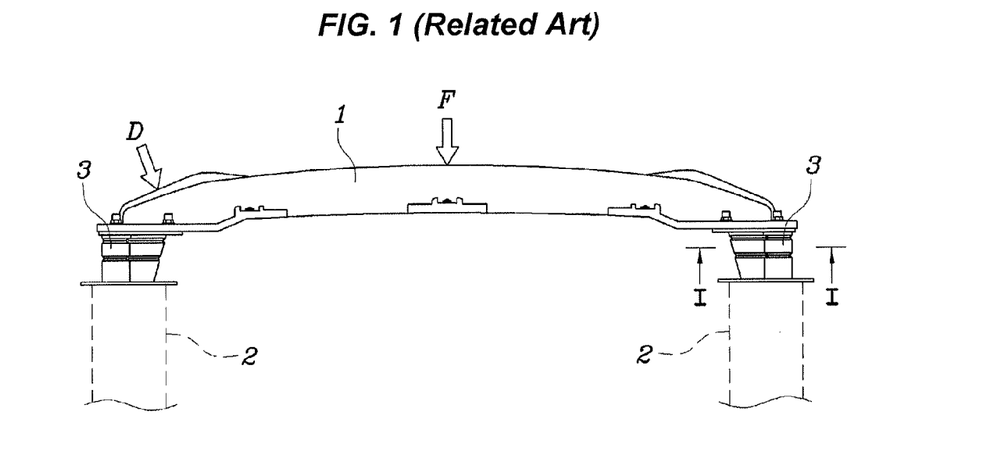
FIG. 1 is a perspective view illustrating a crash box installed between a back beam of a bumper and a side member according to the related art.

Referring to FIG. 1, in the related art, there existed only a corner test way that evaluates compress-deformation performance by applying an impact D of a diagonal direction to the back beam 1 of a vehicle in a conventional RCAR performance test. However, recently a center test way has been added, which evaluates a load support performance by applying an impact F of an axial direction of a vehicle to a middle portion of the back beam 1.

Figure 2:
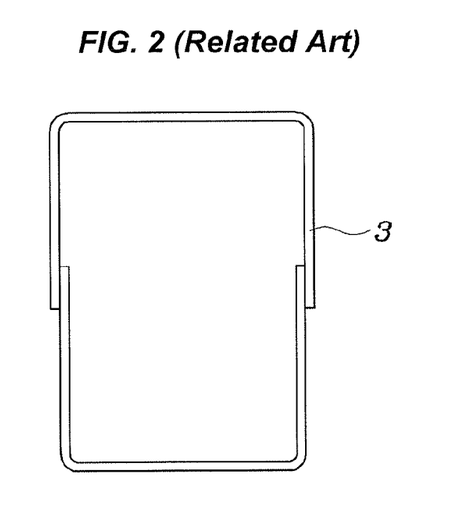
FIG. 2 is a cross-sectional view taken along line I-I of FIG. 1, which illustrates a conventional crash box formed to have cross-section of a quadrangular shape according to the related art.
Figure 3:
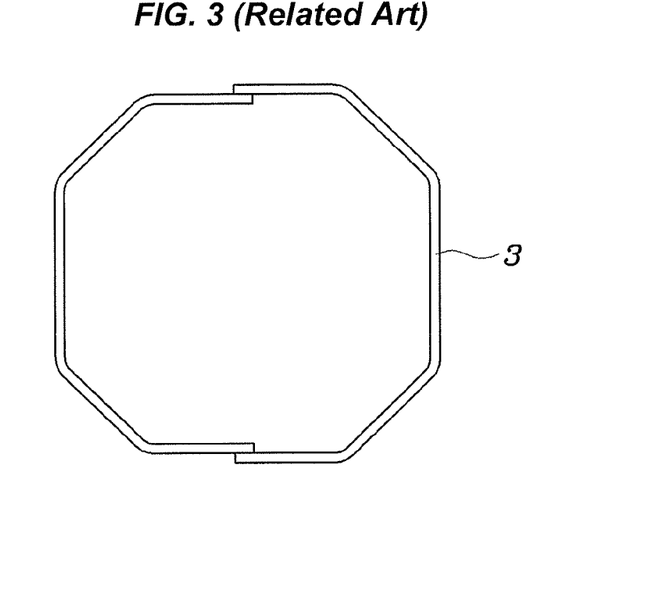
FIG. 3 is a cross-sectional view of another conventional crash box formed to have cross-section of an octagonal shape according to the related art.

Meanwhile, a conventional crash box 3 is formed to have cross-section of a circular shape or a quadrangular shape as shown in FIG. 2, or an octagonal shape as shown in FIG. 3, wherein when it is formed to have cross-section of an octagonal shape which has a high sectional coefficient, an RCAR corner test obtains a high performance satisfaction degree.

However, when the crash box 3 is formed to have cross-section of an octagonal shape, it is advantageous for a compress-deformation, but it is disadvantageous in supporting the load, and thus it does not efficiently respond to an RCAR center test. Further, when the crash box 3 is formed to have cross-section of a quadrangular shape, it is advantageous in supporting the load and thus it efficiently responds to an RCAR center test but it is disadvantageous for the compress-deformation and thus it does not efficiently respond to the RCAR corner test.

Accordingly, there needs to be developed a crash box having an optimum shape which is advantageous in responding to both the RCAR corner test and RCAR center test.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a crash box for a vehicle, which can satisfy simultaneously RCAR corner test and center test through optimizing a sectional shape and further aim to lighten the weight.

According to various aspects of the present invention, a crash box for a vehicle may include a front connection portion that is connected to both ends of a back beam of the vehicle, a rear connection portion that is connected to a side member of the vehicle, an intermediate connection portion for connecting the front connection portion and the rear connection portion, which is formed as a hollow box shape and through which a cut cross-section of a heptangular shape is formed in a vehicle width direction, and a plurality of reinforcement ribs formed at an inner space of the intermediate connection portion.

The intermediate connection portion may have a cross-section of a heptangular shape which is formed by connecting a pair of vertical sides formed in parallel, a pair of horizontal sides formed in parallel, and three inclined sides that each connect slantly each vertical and the horizontal side, the pair of vertical sides may include an inner side arranged in an inner side direction of the vehicle and an outer side arranged in an outer side direction of the vehicle, the pair of horizontal sides may include an upper side arranged in an upper side direction of the vehicle and a lower side arranged in a lower side direction of a vehicle; and the reinforcement rib may include a horizontal rib for connecting the inner side and the outer side and a vertical rib for connecting the upper side and the lower side.

Both ends of the horizontal rib may connect the inner side and the outer side at an intermediate location between the upper side and the lower side, both ends of the vertical rib may connect the upper side and the lower side at an intermediate location between the inner side and the outer side, and the horizontal rib and the vertical rib may be connected in a cross shape.

The horizontal rib and the vertical rib may be connected entirely along a front/rear length direction of the intermediate connection portion.

The inner side and the upper side may be connected at an angle of 90 degrees to form a reinforcement portion and the reinforcement portion may be arranged in an inner side direction of the vehicle.

The crash box may be formed of plastic.

A guide pin may be connected to the rear connection portion, which guides an assembly location when assembled with the side member.

A crash box for a vehicle according to various embodiment of the present invention may include a front connection portion connected to both ends of a back beam of the vehicle; a rear connection portion connected to a side member of the vehicle, an intermediate connection portion for connecting the front connection portion and the rear connection portion, formed as a hollow box shape and through which a cross-section of a heptangular shape is formed in a vehicle width direction, and a plurality of pipe tubes formed along a front/rear length direction of the intermediate connection portion.

The intermediate connection portion may have the cross-section of the heptangular shape which is formed by connecting a pair of vertical sides formed in parallel, a pair of horizontal sides formed in parallel, and three inclined sides that connect slantly the vertical sides and the horizontal sides, the pair of vertical sides may include an inner side arranged in an inner side direction of a vehicle and an outer side arranged in an outer side direction of a vehicle, the pair of horizontal sides may include an upper side arranged in an upper side direction of the vehicle and a lower side arranged in a lower side direction of the vehicle, the inner side and the upper side are connected at an angle of 90 degrees to form a reinforcement portion, and each pipe tube may be disposed on the reinforcement portion and each of the three inclined sides.

The reinforcement portion may be arranged in an inner side direction of the vehicle.

The crash box may be formed of plastic.

A guide pin may be connected to the rear connection portion, which guides an assembly location when assembled with the side member.

A crash box for a vehicle according to various embodiments of the present invention may include a front connection portion connected to both ends of a back beam of the vehicle, a rear connection portion that is connected to a side member of the vehicle, an intermediate connection portion for connecting the front connection portion and the rear connection portion, which is formed as a hollow box shape and through which a cross-section of a heptangular shape is formed in a vehicle width direction, a plurality of reinforcement ribs formed at an inner space of the intermediate connection portion, and a plurality of pipe tubes formed along a front/rear length direction of the intermediate connection portion.

The intermediate connection portion may have the cross-section of the heptangular shape which is formed by connecting a pair of vertical sides formed in parallel, a pair of horizontal sides formed in parallel and three inclined sides that connect slantly the vertical sides and the horizontal sides, the pair of vertical sides may include an inner side arranged in an inner side direction of a vehicle and an outer side arranged in an outer side direction of the vehicle, the pair of horizontal sides may include an upper side arranged in an upper side direction of the vehicle and a lower side arranged in a lower side direction of the vehicle, the inner side and the upper side are connected at an angle of 90 degrees to form a reinforcement portion, the reinforcement rib may include a horizontal rib for connecting the inner side and the outer side and a vertical rib for connecting the upper side and the lower side, and each pipe tube may be disposed on the reinforcement portion and each of the three inclined sides.

Both ends of the horizontal rib may connect the inner side and the outer side at an intermediate location between the upper side and the lower side, both ends of the vertical rib may connect the upper side and the lower side at an intermediate location between the inner side and the outer side, and the horizontal rib and the vertical rib may be connected in a cross shape.

The horizontal rib and the vertical rib may be connected entirely along a front/rear length direction of the intermediate connection portion.

The reinforcement portion may be arranged in an inner side direction of the vehicle.

The crash box may be formed of plastic.

A guide pin may be connected to the rear connection portion, which guides an assembly location when assembled with the side member.

A crash box for a vehicle according to various embodiments of the present invention may include a front connection portion connected to both ends of a back beam of the vehicle, a rear connection portion that is connected to a side member of the vehicle, a plurality of pipe tubes which connect the front connection portion and the rear connection portion and are arranged on four corners up/downward and left/rightward by a sectional arrangement cut in a vehicle width direction, an intermediate connection portion for connecting the front connection portion, the rear connection portion, and each pipe tube, which is adjacent to the front and rear connection portions and formed as a hollow box shape, and a plurality of reinforcement ribs formed at an inner space of the intermediate connection portion.

The crash box for a vehicle may further include a reinforcement pipe that is arranged to be inserted into each pipe tube.

The intermediate connection portion may include a pair of vertical sides formed in parallel and a pair of horizontal sides formed in parallel, the pair of vertical sides may include an inner side arranged in an inner side direction of the vehicle and connecting upper and lower pipe tubes at an inner side direction of the vehicle and an outer side arranged in an outer side direction of the vehicle and connecting the upper and lower pipe tubes at an outer side of the vehicle, the pair of horizontal sides may include an upper side arranged in an upper side direction of a vehicle and connecting the upper pipe tubes that are arranged at the inner and the outer side directions of the vehicle and a lower side arranged in a lower side direction of the vehicle and connecting the lower pipe tubes arranged at the inner and the outer side directions of the vehicle, and the reinforcement rib may include a horizontal rib for connecting the inner side and the outer side and a vertical rib for connecting the upper side and the lower side.

Both ends of the horizontal rib may connect the inner side and the outer side at an intermediate location between the upper side and the lower side, both ends of the vertical rib may connect the upper side and the lower side at an intermediate location between the inner side and the outer side, and the horizontal rib and the vertical rib may be connected in a cross shape.

The horizontal rib and the vertical rib may be connected entirely along a front/rear length direction of the intermediate connection portion.

The reinforcement pipe may be press-inserted into each pipe tube and the reinforcement pipe may be formed of plastic.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 4:
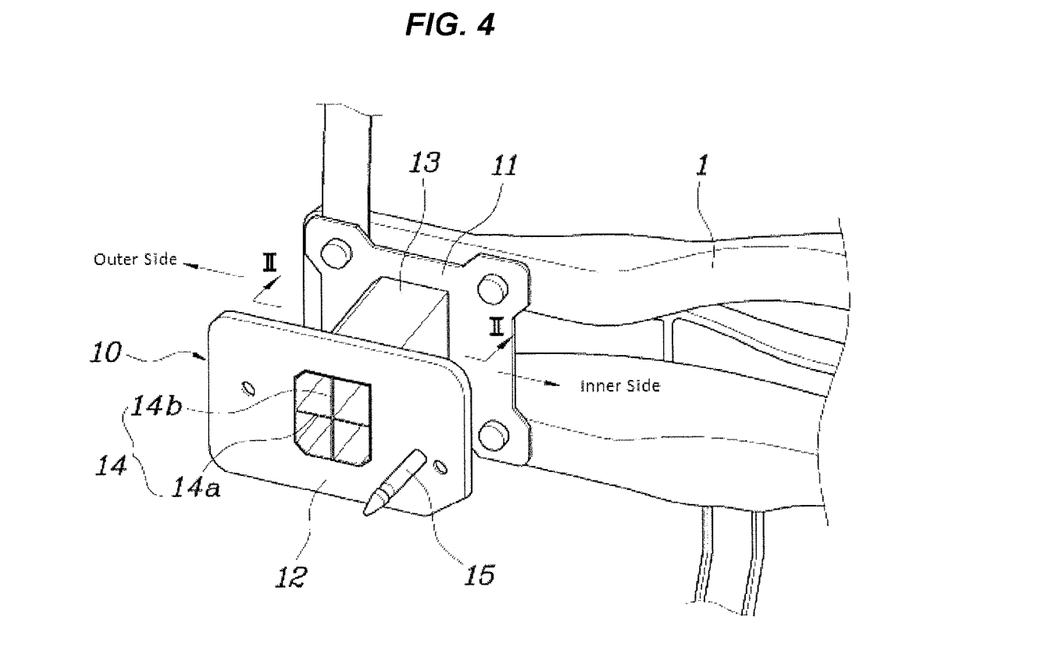
FIG. 4 is a perspective view illustrating an exemplary crash box according to the present invention.
Figure 5:
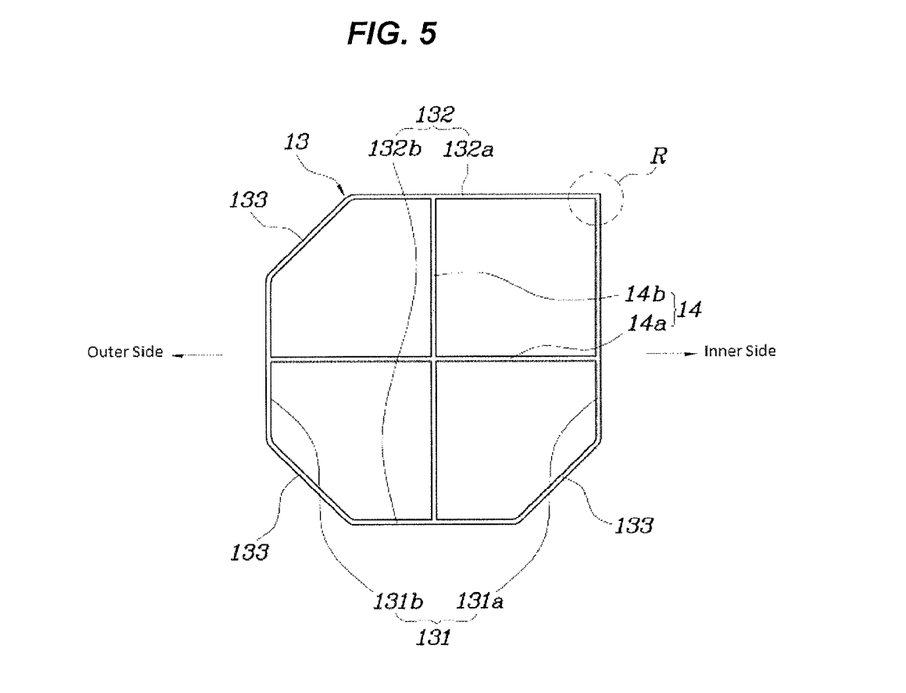
FIG. 5 is a cross-sectional view taken along line II-II of FIG. 4.

A crash box 10 according to various embodiments of the present invention, as shown in FIGS. 4 and 5, may include a front connection portion 11 that is connected to both ends of a back beam 1, a rear connection portion 12 that is connected to a side member 2 (referring to FIG. 1), an intermediate connection portion 13 for connecting the front connection portion 11 and the rear connection portion 12, which is formed as a hollow box shape and through which a cut cross-section of a heptangular shape is formed in a vehicle width direction, and a plurality of reinforcement ribs 14 formed at an inner space of the intermediate connection portion 13.

That is, the intermediate connection portion 13 of the crash box 10 according to an embodiment of the present invention is formed to have the cross-section of a heptangular shape and thus it is advantageous for a compress-deformation thereby to implement a high performance satisfaction degree when an RCAR corner test is performed, and further, a sufficient rigidity is maintained through the plurality of reinforcement ribs 14 and thus the intermediate connection portion 13 is advantageous in responding to an RCAR center test.

The intermediate connection portion 13 is configured to have the cross-section of a heptangular shape which is formed by connecting a pair of vertical sides 131 formed in parallel, a pair of horizontal sides 132 formed in parallel, and 3 inclined sides 133 that diagonally connect the vertical sides 131 and the horizontal sides 132. Here, the pair of vertical sides 131 consists of an inner side 131a arranged in an inner side direction of the vehicle and an outer side 131b arranged in an outer side direction of the vehicle, the pair of horizontal sides 132 consists of an upper side 132a arranged in an upper side direction of the vehicle and a lower side 132b arranged in a lower side direction of the vehicle, and each reinforcement rib 14 consists of a horizontal rib 14a for connecting the inner side 131a and the outer side 131b and a vertical rib 14b for connecting the upper side 132a and the lower side 132b.

Both ends of the horizontal rib 14a may connect the inner side 131a and the outer side 131b at an intermediate location between the upper side 132a and the lower side 132b so as to be able to uniformly improve the rigidity of the upper and lower parts of the vertical side 131 based on the horizontal rib 14a.

Further, both ends of the vertical rib 14b may connect the upper side 132a and the lower side 132b at an intermediate location between the inner side 131a and the outer side 131b so as to be able to uniformly improve the rigidity of the left and right parts of the horizontal side 132 based on the vertical rib 14b.

Additionally, the intermediates of the horizontal rib 14a and the vertical rib 14b are crossed at a right angle, thereby uniformly improving the rigidity of the crash box 10 in the upward/downward and leftward/rightward.

In addition, the horizontal rib 14a and the vertical rib 14b may be connected entirely along a front/rear length direction of the intermediate connection portion 13 thereby to improve entirely the rigidity of the intermediate connection portion 13 along a front/rear length direction.

Meanwhile, the inner side 131a and the upper side 132a are connected at an angle of 90 degrees to form a reinforcement portion R and the reinforcement portion R is arranged in an inner side direction of the vehicle.

The reinforcement portion R is a part on which impact energy is concentrated when an RCAR corner test is performed, where it connects the inner side 131a and the upper side 132a at an angle of 90 degrees thereby to maintain sufficient rigidity thereon.

The crash box 10 according to various embodiments of the present invention may be formed of plastic thereby to be light-weight and improve fuel efficiency.

Further, a guide pin 15 is connected to the rear connection portion 12, which guides an assembly location when it is assembled with the side member 2, where the guide pin 15 is inserted into a guide hole formed through the side member 2 to regulate the assembly location of the crash box 10.

Figure 6:
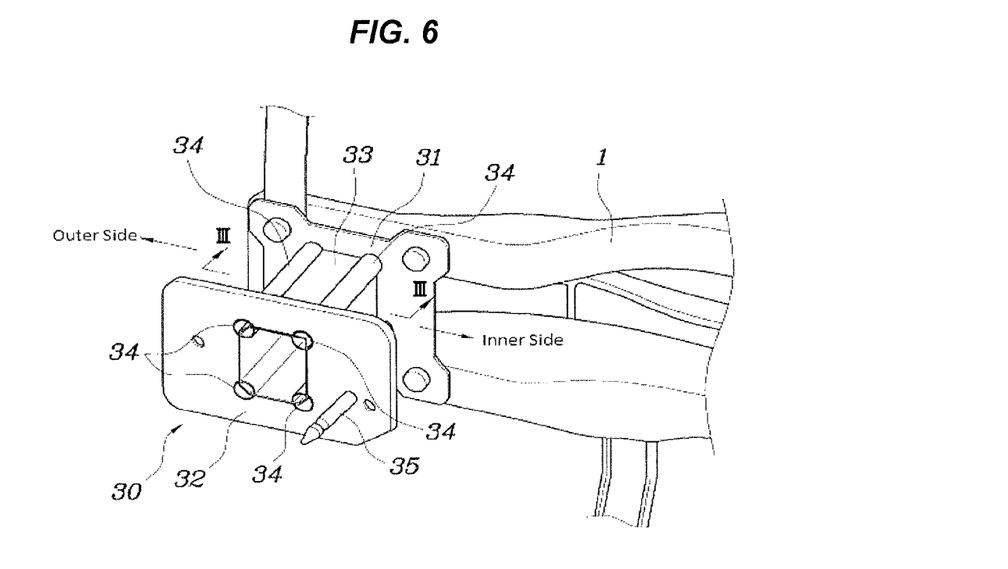
FIG. 6 is a perspective view illustrating an exemplary crash box according to the present invention.
Figure 7:
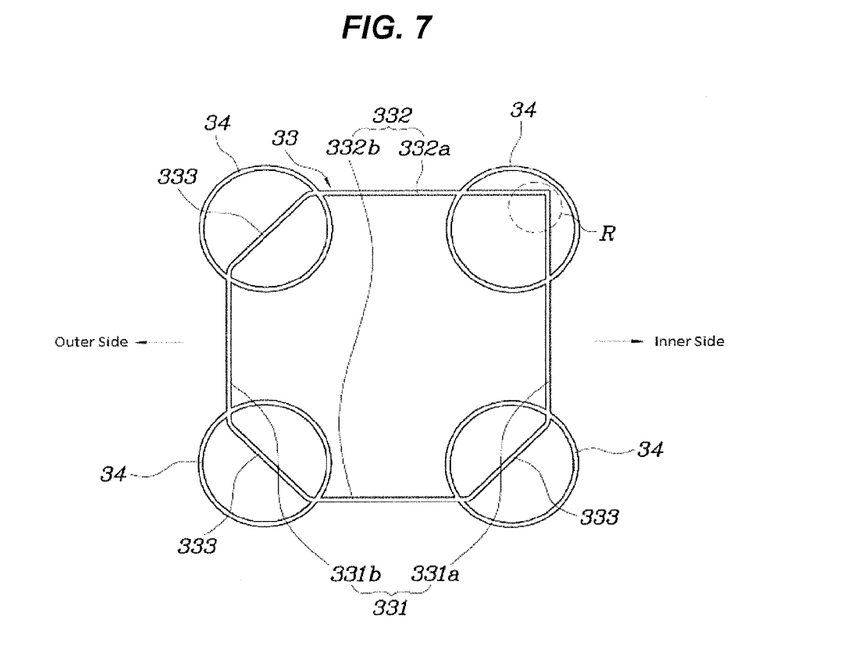
FIG. 7 is a cross-sectional view taken along line of FIG. 6.

FIGS. 6 and 7 illustrate the crash box 30 according various embodiments of the present invention wherein the crash box 30 may include a front connection portion 31 that is connected to both ends of a back beam 1, a rear connection portion 32 that is connected to a side member 2 (referring to FIG. 1), an intermediate connection portion 33 for connecting the front connection portion 31 and the rear connection portion 32, which is formed as a hollow box shape and through which a cut cross-section of a heptangular shape is formed in a vehicle width direction, and a plurality of pipe tubes 34 formed along a front/rear length direction of the intermediate connection portion 33.

That is, the intermediate connection portion 33 of the crash box 30 according to various embodiments of the present invention is formed to have cross section of a heptangular shape and thus it is advantageous for a compress-deformation thereby to implement a high performance satisfaction degree when an RCAR corner test is performed, and further a sufficient rigidity is maintained through the plurality of pipe tubes 34 and thus it is advantageous in responding to an RCAR center test.

The intermediate connection portion 33 is configured to have cross-section of a heptangular shape which is formed by connecting a pair of vertical sides 331 formed in parallel, a pair of horizontal sides 332 formed in parallel, and 3 inclined sides 333 that diagonally connect the vertical sides 331 and the horizontal sides 332. Here, the pair of vertical sides 331 consists of an inner side 331a arranged in an inner side direction of a vehicle and an outer side 331b arranged in an outer side direction of a vehicle, the pair of horizontal sides 332 consists of an upper side 332a arranged in an upper side direction of a vehicle and a lower side 332b arranged in a lower side direction of a vehicle, the inner side 331a and the upper side 332a are connected at an angle of 90 degrees to form the reinforcement portion R, and the pipe tube 34 is disposed on the reinforcement portion R and the inclined side 333.

The reinforcement portion R is arranged in an inner side direction of a vehicle, the crash box 30 may be formed of plastic, and a guide pin 35 is connected to the rear connection portion 32, which guides an assembly location when it is assembled with the side member 2.

Figure 8:
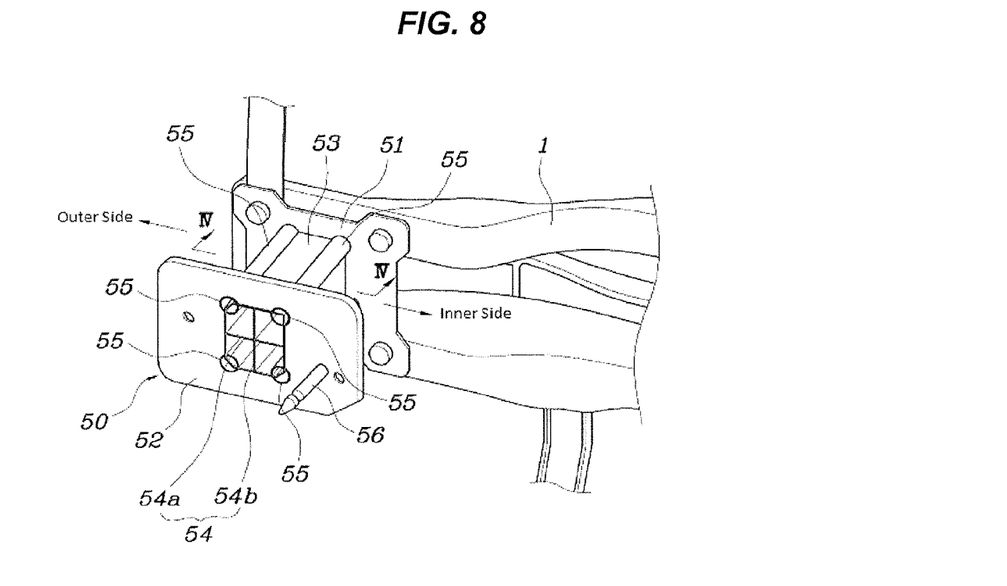
FIG. 8 is a perspective view illustrating an exemplary crash box according to the present invention.
Figure 9:
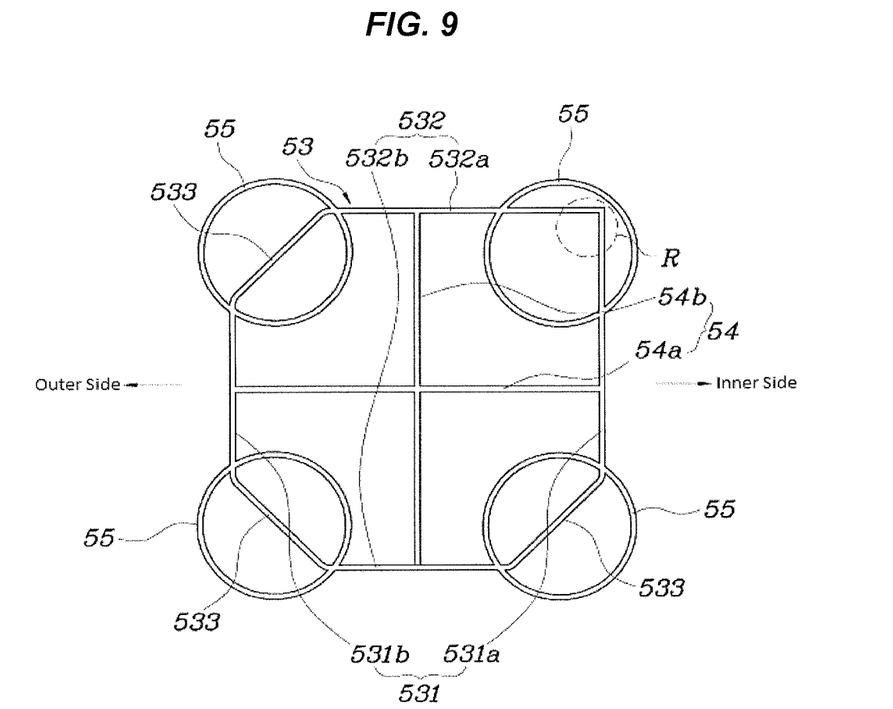
FIG. 9 is a cross-sectional view taken along line IV-IV of FIG. 8.

FIGS. 8 to 9 illustrate the crash box 50 according to another embodiment of the present invention in which the crash box 50 may include a front connection portion 51 that is connected to both ends of a back beam 1, a rear connection portion 52 that is connected to a side member 2 (referring to FIG. 1), an intermediate connection portion 53 for connecting the front connection portion 51 and the rear connection portion 52, which is formed as a hollow box shape and through which a cut cross-section of a heptangular shape is formed in a vehicle width direction, a plurality of reinforcement ribs 54 formed at an inner space of the intermediate connection portion 53; and a plurality of pipe tubes 55 formed along a front/rear length direction of the intermediate connection portion 53.

That is, the intermediate connection portion 53 of the crash box 50 according to various embodiments of the present invention is formed to have the cross-section of a heptangular shape and thus it is advantageous for a compress-deformation thereby to implement a high performance satisfaction degree when an RCAR corner test is performed, and further a sufficient rigidity is maintained through the plurality of reinforcement ribs 54 and the plurality of pipe tubes 34 and thus it is advantageous in responding to an RCAR center test.

The intermediate connection portion 53 is configured to have the cross-section of a heptangular shape which is formed by connecting a pair of vertical sides 531 formed in parallel, a pair of horizontal sides 532 formed in parallel, and 3 inclined sides 533 that connect slantly the vertical sides 531 and the horizontal sides 532. Here, the one pair of vertical sides 531 consists of an inner side 531a arranged in an inner side direction of a vehicle and an outer side 531b arranged in an outer side direction of a vehicle, the one pair of horizontal sides 532 consists of an upper side 532a arranged in an upper side direction of a vehicle and a lower side 532b arranged in a lower side direction of a vehicle, the inner side 531a and the upper side 532a are connected at an angle of 90 degrees to form the reinforcement portion R, the reinforcement rib 54 consists of a horizontal rib 54a for connecting the inner side 531a and the outer side 531b and a vertical rib 54b for connecting the upper side 532a and the lower side 532b, and the pipe tube 55 is disposed on the reinforcement portion R and the 3 inclined sides 533.

Both ends of the horizontal rib 54a may connect the inner side 531a and the outer side 531b at an intermediate location between the upper side 532a and the lower side 532b, and further, both ends of the vertical rib 54b may connect the upper side 532a and the lower side 532b at an intermediate location between the inner side 531a and the outer side 531b wherein the horizontal rib 54a and the vertical rib 54b are connected in a cross shape.

In addition, the horizontal rib 54a and the vertical rib 54b may be connected entirely along a front/rear length direction of the intermediate connection portion 53, the reinforcement portion R is arranged in an inner side direction of a vehicle, the crash box 50 may be formed of plastic, and a guide pin 56 is connected to the rear connection portion 52, which guides an assembly location when it is assembled with the side member 2.

Figure 10A:
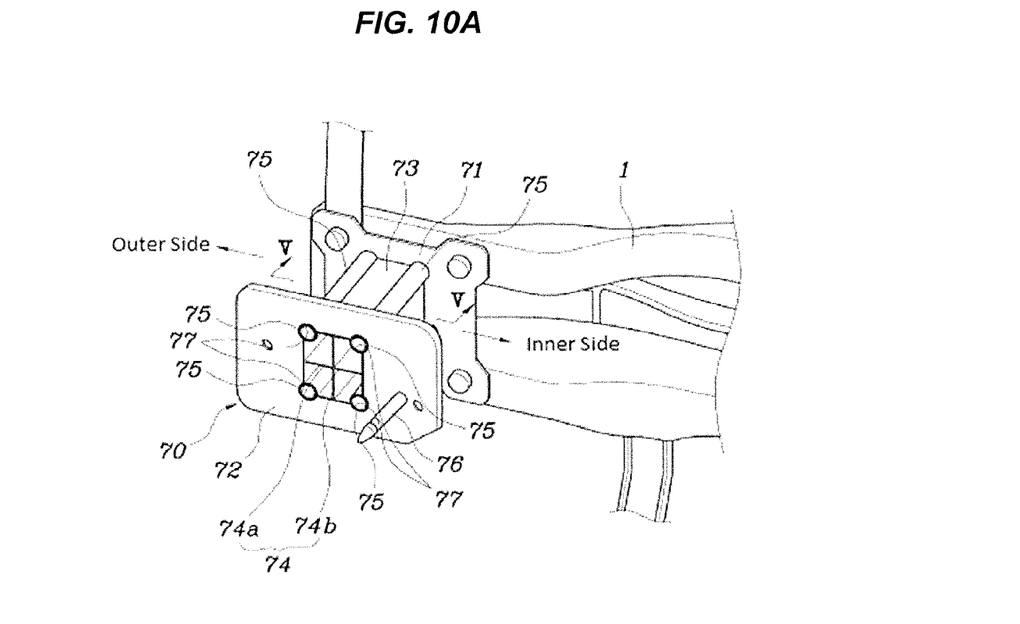
FIG. 10A and FIG. 10B are perspective views illustrating an exemplary crash box according to the present invention.
Figure 10B:
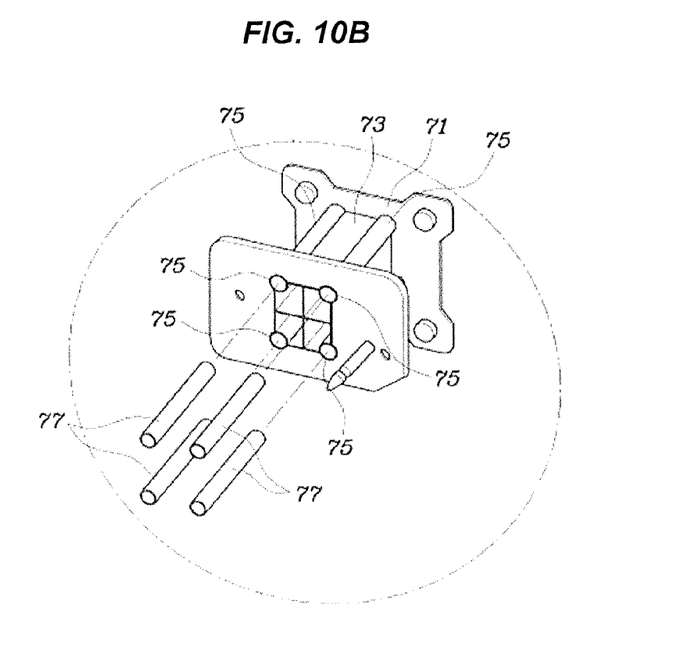
Figure 11:
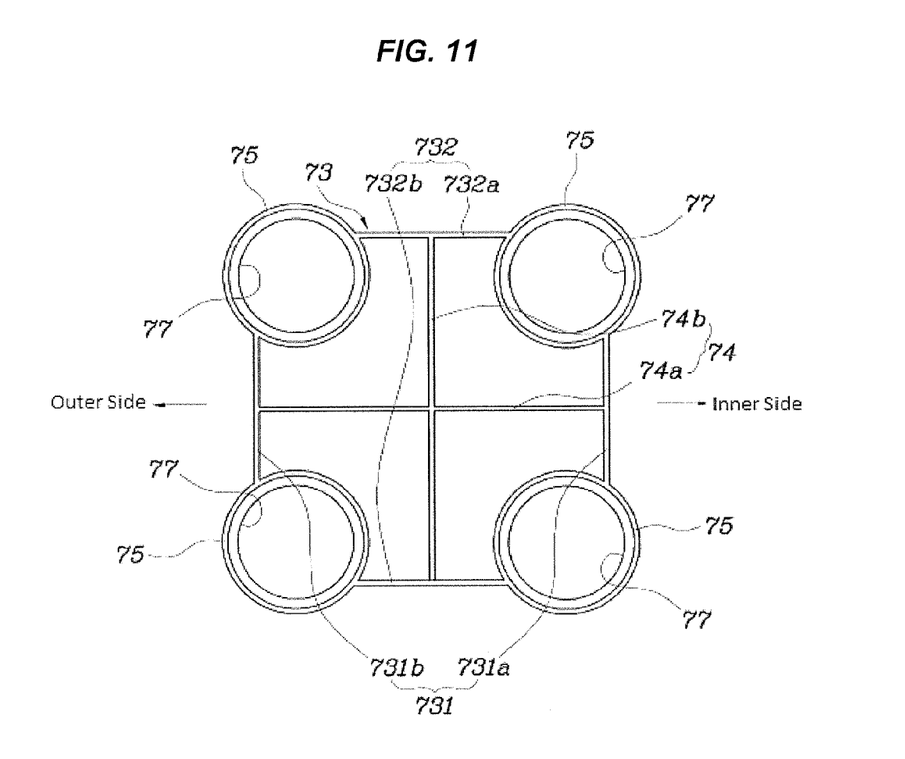
FIG. 11 is a cross-sectional view taken along line V-V of FIG. 10.

FIGS. 10 and 11 illustrate the crash box 70 according to various embodiments of the present invention wherein the crash box 70 may include a front connection portion 71 that is connected to both ends of a back beam 1, a rear connection portion 72 that is connected to a side member 2 (referring to FIG. 1), a plurality of pipe tubes 75 which connect the front connection portion 71 and the rear connection portion 72 and are arranged on four corners up/downward and left/rightward by a sectional arrangement cut in a vehicle width direction, an intermediate connection portion 73 for connecting the front connection portion 71, the rear connection portion 72, and the pipe tube 75, which is adjacent to the front and rear connection portions and formed as a hollow box shape; and a plurality of reinforcement ribs 74 formed at an inner space of the intermediate connection portion 73.

Further, the crash box 70 may further include a reinforcement pipe 77 that is arranged to be inserted into the pipe tube 75.

The reinforcement pipe 77 greatly increases the rigidity of the whole crash box 70 through strength reinforcement of the pipe tube 75 in which one reinforcement pipe 77 is press-inserted into each pipe tube 75 and is formed of plastic so as to be light-weight.

The intermediate connection portion 73 of the crash box 70 according to various embodiments of the present invention is configured to connect the pipe tubes 75 that are installed by a quadrangular arrangement and thus it is advantageous for a compress-deformation thereby to implement a high performance satisfaction degree when an RCAR corner test is performed, and further, a sufficient rigidity is maintained through the plurality of reinforcement ribs 74 and the plurality of pipe tubes 75 and thus it is advantageous in responding to an RCAR center test.

The intermediate connection portion 73 consists of, as shown in FIG. 11, a pair of vertical sides 731 formed in parallel and a pair of horizontal sides 732 formed in parallel wherein the one pair of vertical sides 731 consists of an inner side 731a that is arranged in an inner side direction of a vehicle and connects the upper and lower pipe tubes 75 at an inner side and an outer side 731b that is arranged in an outer side direction of a vehicle and connects the upper and lower pipe tubes 75 at an outer side, the one pair of horizontal sides 732 consists of an upper side 732a that is arranged in an upper side direction of a vehicle and connects the upper pipe tubes 75 that are arranged at inner and outer sides and a lower side 732b that is arranged in a lower side direction of a vehicle and connects the lower pipe tubes 75 that are arranged at inner and outer sides, and the reinforcement rib 74 consists of a horizontal rib 74a for connecting the inner side 731a and the outer side 731b and a vertical rib 74b for connecting the upper side 732a and the lower side 732b.

Both ends of the horizontal rib 74a may connect the inner side 731a and the outer side 731b at an intermediate location between the upper side 732a and the lower side 732b, and further, both ends of the vertical rib 74b may connect the upper side 732a and the lower side 732b at an intermediate location between the inner side 731a and the outer side 731b wherein the horizontal rib 74a and the vertical rib 74b are connected in a cross shape.

The horizontal rib 74a and the vertical rib 74b are connected entirely along a front/rear length direction of the intermediate connection portion 73, the crash box 70 may be formed of plastic, and a guide pin 76 is connected to the rear connection portion 72, which guides an assembly location when it is assembled with the side member 2.

As described above, according to the crash box of the present invention, the intermediate connection portion is configured to have cross-section of a heptagonal shape so as to maintain impact absorption and rigidity and thus it is advantageous for a compress-deformation, thereby implementing a high performance satisfaction degree when an RCAR corner test is performed. Further a sufficient rigidity is maintained through the plurality of reinforcement ribs and the plurality of pipe tubes and thus it is advantageous in responding to an RCAR center test.

In addition, the crash box according to various embodiments of the present invention may be formed of plastic thereby to be light-weight and improve fuel efficiency.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crash box for a vehicle comprising:
   a front connection portion connected to both ends of a back beam of the vehicle;
   a rear connection portion connected to a side member of the vehicle;
   a plurality of pipe tubes which connect the front connection portion and the rear connection portion and are arranged on four corners up/downward and left/rightward by a cross-sectional arrangement cut in a vehicle width direction;
   an intermediate connection portion for connecting the front connection portion, the rear connection portion, and each pipe tube, which is adjacent to the front and rear connection portions and formed as a hollow box shape; and
   a plurality of reinforcement ribs formed at an inner space of the intermediate connection portion.

2. The crash box for the vehicle of claim 1, further comprising a reinforcement pipe that is arranged to be inserted into each pipe tube.

3. The crash box for the vehicle of claim 1,
   wherein the intermediate connection portion includes a pair of vertical sides formed in parallel and a pair of horizontal sides formed in parallel,
   wherein the pair of vertical sides include an inner side arranged in an inner side direction of the vehicle and connecting upper and lower pipe tubes at the inner side direction of the vehicle and an outer side arranged in an outer side direction of the vehicle and connecting the upper and lower pipe tubes at the outer side direction of the vehicle,
   wherein the pair of horizontal sides includes an upper side arranged in an upper side direction of the vehicle and connecting the upper pipe tubes that are arranged at the inner and the outer side directions of the vehicle and a lower side arranged in a lower side direction of the vehicle and connecting the lower pipe tubes arranged at the inner and the outer side directions of the vehicle, and
   wherein the reinforcement rib includes a horizontal rib for connecting the inner side and the outer side and a vertical rib for connecting the upper side and the lower side.

4. The crash box for the vehicle of claim 3, wherein both ends of the horizontal rib connect the inner side and the outer side at an intermediate location between the upper side and the lower side, and both ends of the vertical rib connect the upper side and the lower side at an intermediate location between the inner side and the outer side wherein the horizontal rib and the vertical rib are connected in a cross shape.

5. The crash box for the vehicle of claim 3, wherein the horizontal rib and the vertical rib are connected entirely along a front/rear length direction of the intermediate connection portion.

6. The crash box for the vehicle of claim 1, wherein the crash box is formed of plastic.

7. The crash box for the vehicle of claim 1, wherein a guide pin is connected to the rear connection portion, which guides an assembly location when assembled with the side member.

8. The crash box for the vehicle of claim 2, wherein the reinforcement pipe is press-inserted into each pipe tube.

9. The crash box for the vehicle of claim 2, wherein the reinforcement pipe is formed of plastic.

* * * * *